United States Patent

Stockebrand

[15] 3,665,608

[45] May 30, 1972

[54] POSITION-LOCATING SYSTEM

[72] Inventor: Thomas C. Stockebrand, Boxboro, Mass.

[73] Assignee: Digital Equipment Corporation, Maynard, Mass.

[22] Filed: July 17, 1969

[21] Appl. No.: 842,582

[52] U.S. Cl. .................................... 33/1 M, 340/347 AD
[51] Int. Cl. ........................................... G01c 21/20
[58] Field of Search ............... 33/1 M, 1 MP; 340/347 AD

[56] References Cited

UNITED STATES PATENTS

| | | | |
|---|---|---|---|
| 3,271,564 | 9/1966 | Rosenfeld et al. | 340/347 RP X |
| 3,492,421 | 1/1970 | Cameron | 33/1 M |
| 3,500,379 | 3/1970 | Gibbons et al. | 33/1 M X |
| 3,564,533 | 2/1971 | Linn | 33/1 M X |

*Primary Examiner*—William D. Martin, Jr.
*Attorney*—Cesari and McKenna

[57] ABSTRACT

A stylus whose position is to be determined is attached to ends of two strings. The other ends of the strings are wrapped around and attached to a pair of spring-biased, rotatable drums. When the stylus is moved, one or both of the drums rotate to accommodate the change in length of the strings and the angular positions of the drums therefore correspond with the position of the stylus. The drum angles are measured by angle transducers whose outputs are processed by a computer to provide a reading of the stylus position.

5 Claims, 2 Drawing Figures

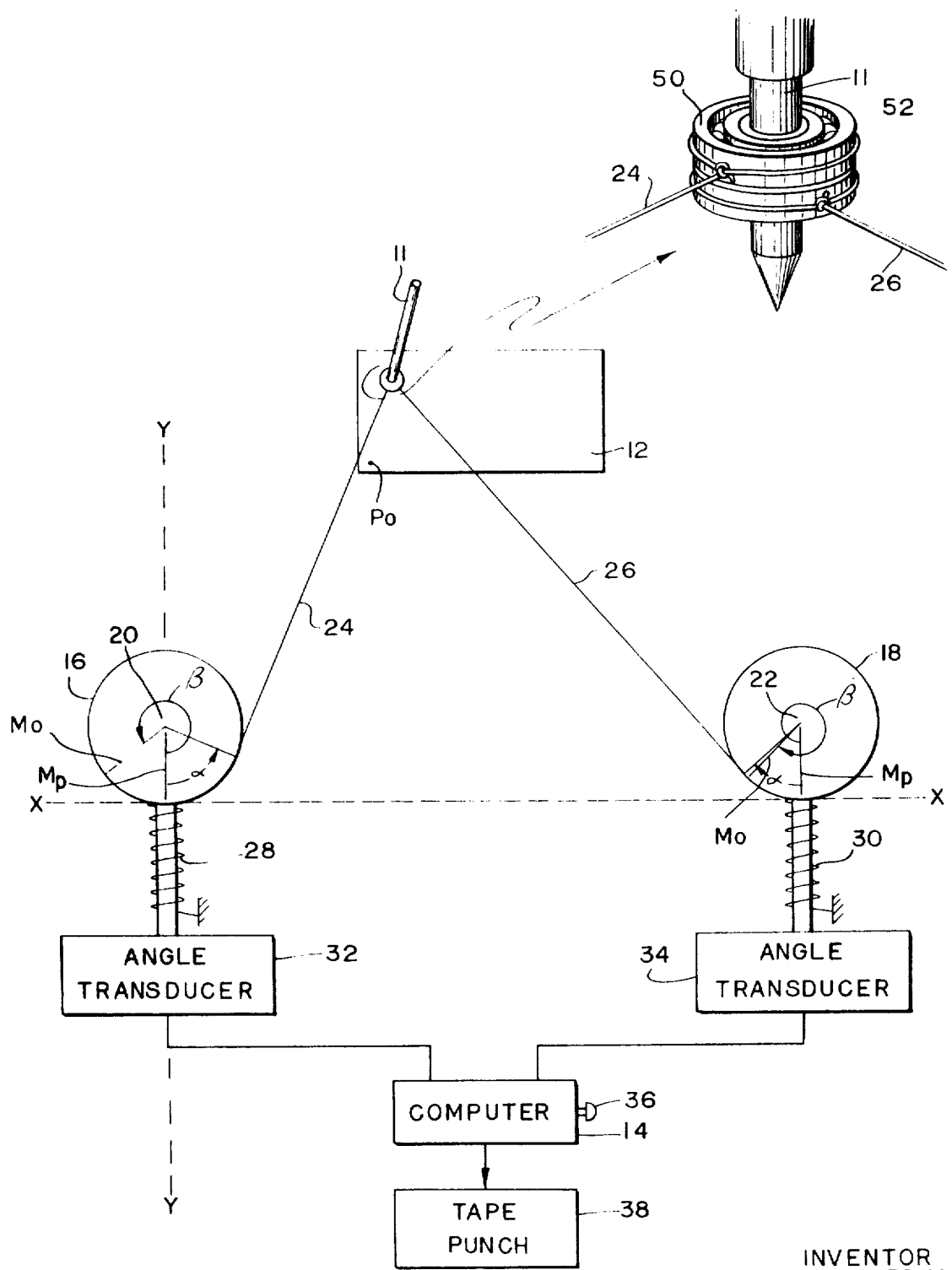

POSITION-LOCATING SYSTEM

BACKGROUND OF INVENTION a. Field of the Invention

This invention relates to a position-locating system that automatically senses the position of a stylus and records the position in terms of coordinates that are readily interpreted by other devices such as automatic machine tools. The invention also relates to a position reader whose output is readily converted to a conventional coordinate reading.

The design of an article to be machined is sometimes rendered first as a scale drawing in which the locations of machine operations are indicated, but their coordinates are shown only graphically. That is, the coordinates are not expressed numerically. Even so, each machine operation may have to be precisely located so as to coordinate with the other operations performed on the workpiece.

An example of this is the manufacture of printed circuit boards. The designer makes a drawing depicting the conductors, as well as the holes through them used in making connections, none of the coordinates being numerically expressed. The conductors are reproduced exactly on the board by photo-etching techniques and the holes must then be drilled in the correct positions. For this, the coordinates of the holes must be measured on the drawing and then recorded for later control of a drilling machine.

b. Prior Art

One system used for this purpose comprises a carriage movable along one axis and a second carriage mounted on the first carriage and movable along a perpendicular axis with respect thereto. A stylus or cross-hair reticule or other sighting device is carried on the second carriage. The operator moves the carriages to position the sighting device directly over a point to be located and then triggers outputs from position transducers connected to the carriages. These signals correspond directly to rectilinear coordinates of the point. The coordinates are recorded in suitable form for later controlling a machine tool to operate at the same point on the workpiece.

This system is easily operated and it provides sufficient accuracy. However, it is overly expensive in many cases, especially for the locations of holes in printed circuit boards.

OBJECTS OF THE INVENTION

Accordingly, it is an object of the present invention to provide a position-locating system that locates the position of a point with sufficient precision and yet has a relatively low cost.

It is a further object of the invention to provide a system of the above type whose output is directly usable by tape-controlled machine tools.

It is another object of the invention to provide a low-cost position reader for use in a system of the above type.

SUMMARY OF THE INVENTION

Briefly, my locating system employs (a) a simple position sensor that identifies the location of a point in terms of curvilinear coordinates, and (b) a data processor that converts the coordinates to a rectilinear form more suitable for use by automatic machine tools. The position sensor comprises a pair of rotatable drums having strings wound around and attached to them. The free ends of the strings are attached to a pointer, both drums being biased so as to wind up the strings.

It can be shown that the position of the pointer is a function of the angle of rotation of each of the drums with respect to a reference angle. Therefore, the outputs of conventional angle transducers attached to the drums are indicative of the position of the pointer. A digital computer rapidly converts these drum angle readings to the Cartesian coordinates of the pointer, or such other coordinates as one may desire.

BRIEF DESCRIPTION OF THE DRAWING

For a fuller understanding of the nature and objects of the invention, reference should be had to the following detailed description taken in connection with the accompanying drawing, in which:

FIG. 1 is a schematic diagram of a position-locating system incorporating the invention; and FIG. 2 is an enlarged view of the pointer and its connections to other elements of the system.

DETAILED DESCRIPTION OF THE INVENTION

As shown in the drawing, a position sensor generally indicated at 10 is arranged to sense the position of a stylus 11 on a drawing 12 supported on a table top 13. A computer 14 converts the output of the sensor 10 into a form suitable for control of a machine that is to perform operations indicated on the drawing 12.

The sensor 10 comprises a pair of drums 16 and 18 rotatable about parallel axes 20 and 22 that are preferably perpendicular to the table top 13. A stylus 11 is attached to the free ends of strings 24 and 26 which are wound around and anchored to the drums 16 and 18. Springs 28 and 30 bias the drums so as to maintain tension on the strings. Finally, the sensor 10 includes angle transducers 32 and 34 that provide electrical outputs indicative of the amount of rotation of the drums from reference positions.

It will be apparent that the set of outputs of the transducers 32 and 34 is a function of the position of the stylus 11, inasmuch as any movement of the stylus will change the angular position of one or both of the drums 16 and 18. Specifically, for any given angular position of one of the drums, the stylus 11 may lie anywhere on a spiral about the axis of that drum, the spiral being unambiguously defined by the drum's angular position. Thus, the stylus 11 is positioned on the intersection of two spirals that are defined by the outputs of the transducers 32 and 34.

Actually, the position of the stylus can be derived directly in Cartesian coordinates. Consider, for example, a coordinate system as shown in the drawing, with the X axis being a horizontal line tangent to the bottoms of the drums 16 and 18 and the Y axis a vertical line passing through the axis 20 of the drum 16.

Assume that if each of the drums were rotated to fully wind up its 16 the free end of the string would be on the X axis and a reference radial line $M_o$ would be perpendicular to the X axis. This is the reference position of the drum. The angle $\beta$ shown in the drawing is the amount of drum rotation from the reference position when the free ends of the strings (24 and 26) are at the point P. $\beta$ is therefore the angle to the reference radial $M_o$ from the radial $M_p$ that is perpendicular to the X axis when the string ends are at P. From simple trigonometric relationships it can be shown that the coordinates X Y of the point P are given by:

$$X/r_{16} = \sin \alpha_{16} + (\beta_{16} - \alpha_{16}) \cos \alpha_{16} \quad (1)$$
$$X/r_{18} = L/r_{18} - \sin\alpha_{18} - (\beta_{18} - \alpha_{18}) \cos\alpha_{18} \quad (2)$$
$$Y/r_{16} = 1 - \cos\alpha_{16} + (\beta_{16} - \alpha_{16}) \sin\alpha_{16} ; \quad (3)$$

and $$Y/r_{18} = 1 - \cos \alpha_{18} + (\beta_{18} - \alpha_{18}) \sin \alpha_{18} ; \quad (4)$$

where the subscripts 16 and 18 refer to the drums 16 and 18, respectively;

$\alpha$ is the angle from the radial $M_p$ to the point of tangency between each drum and its string;

$L$ is the distance between the axes 20 and 22; and $r$ is the radius of the drums 16 and 18.

The values $\beta_{16}$ and $\beta_{18}$ are provided by the transducers 32 and 34. Accordingly, the four equations (1), (2), (3) and (4) contain four unknowns, viz. X, Y, $\alpha_{16}$ and $\alpha_{18}$ and can therefore be solved for X and Y. A general purpose digital computer 14 can be programmed to compute these coordinates, a process that takes place in a fraction of a second.

Thus, all the operator has to do is place the stylus 11 on the point whose coordinates are to be determined and then actuate a pushbutton 36 or foot switch to signal the computer to compute the coordinates from the outputs of the transducers 32 and 34. The computer is programmed to immediately enter the transducer outputs into internal registers and then commence the required computations. In the meantime, the operator can move the stylus 11 to another point on the drawing 12 and, by the time he has the stylus positioned at that point, the computer 14 will have computed the position of the previous point and punched the coordinates into a tape by means of a tape punch 38, and/or printed the results for the record.

It should be noted that if the drums 16 and 18 have relatively small diameters there may be several intersections of the two spirals defining the ends of strings 24 and 26, within the drawing 12. This ambiguity can be resolved by first approximating the free length of each string as the product of the angle $\beta$ and the drum radius $r$, and assuming that each string extends directly to the stylus 11 from the point of tangency between the string's drum and the X axis.

The point P is then approximately at the apex of the triangle whose legs are the string lengths thus determined and whose base is the inter-axis distance L. The computer 14 can readily solve the triangle for the approximate coordinates of P (within a few percent), and it can start from there in converging on the solutions for X and Y, thereby preventing ambiguity.

The ambiguity can also be resolved by constraining the solutions of the angles $\alpha$ to values less than $2\pi$ radians. However, even then the use of the triangle approximation is helpful. Equations (1–4) are solved by a successive approximation method and the triangle approximation allows the computer to begin this process from a point near the ultimate solutions, thereby conserving computer time.

It will be apparent that the Y accuracy of the system will be minimal if the point P lies on the line connecting the drum axes 20 and 22, since a small deviation in Y will then cause a negligible change in the free lengths of strings 24 and 26 and a correspondingly small change in the drum angles $\beta_{16}$ and $\beta_{18}$. Conversely, for large values of Y, the X accuracy of the system will diminish, since changes in X will result in very small changes in the lengths of the strings. In these two extremes, the strings 24 and 26 are essentially parallel to each other or in alignment.

The system has its maximum accuracy, on the other hand, when the strings are perpendicular to each other. The locus of the points P corresponding to this condition is the circle whose diameter is the line connecting the axes 20 and 22. The drawing 12 is therefore located so that it is approximately bisected by this circle and the drum axes 20 and 22 are spaced sufficiently far apart that this circle is large compared with the drawing 12. Thus, all points on the drawing 12 will be relatively close to the circle, i.e. in the region of maximum accuracy. I have obtained an accuracy of better than 0.03 inch over a 30 × 40 inch drawing with drums having a 1-inch radius. In this connection, another important consideration is the fact that the cost of the system is substantially less than the costs of prior systems providing the same accuracy.

The strings 24 and 26 actually are wires so as to minimize the amount of stretch in them. Even so, their stretching does have a significant effect on the readings. Therefore, the springs 28 and 30 are preferably constant torque springs so that the tension on the strings 24 and 26 is independent of the angles $\beta_{16}$ and $\beta_{18}$. Moreover, there is little friction between the strings and the drums, all of which tends to keep the overall lengths of the strings essentially independent of the coordinates of the point P. Accordingly, changes in string length because of reversals of stress from friction need not be taken into account when the stylus 11 is moved from one point to another.

However, the lengths of the strings 24 and 26 are subject to change by such factors as temperature and age, and the system must be corrected for this. Therefore, the operator occasionally (e.g. once per day) moves the stylus 11 to a point $P_o$, whose coordinates are known with a substantial degree of accuracy. The operator then actuates the system to determine the coordinates of the stylus position in the manner described above, and if the reading differs from the known coordinate values, appropriate corrections are made. In essence, these corrections amount to an angular shift of the reference radial $M_o$. This can be accomplished manually by adjustment of the transducers 32 and 34 on the drum shafts. Preferably, however, the computer 14 is programmed to make the same correction mathematically. It determines a correction in the angles $\beta$ and then applies the corrections to subsequent calculations.

The stylus 11 is a simplified version of the various types of pointer that one might use. I prefer an optical device providing some magnification and containing a cross-hair reticule. The operator positions the cross-hair intersection over the point whose coordinates are to be determined, the magnification increasing the accuracy of this operation.

The strings 24 and 26 should be on lines passing through, or directly over, the points selected by the operator. Thus, they or their conceptual extensions should converge at a point in vertical alignment with the reticule intersection. As shown in FIG. 2, this is accomplished by tying the ends of the strings to the outer races 50 and 52 of ball bearings whose inner races are attached to the pointer.

It will thus be seen that I have provided a simple and relatively inexpensive coordinate-determining system that provides substantial accuracy, is easily operated even by relatively unskilled personnel, and is characterized by a high degree of reliability. The system includes a position reader whose output is provided by a pair of angular transducers and, with this arrangement, a relatively inexpensive construction can be utilized. Even with the small digital computer that is required for rapid conversion of the transducer outputs to Cartesian coordinates, the cost of the system is eminently reasonable and even this relatively low cost can be reduced by employing a single computer with a number of position readers on a time-sharing basis.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

I claim:

1. A position reader for reading the coordinates of a point on a generally planar surface, said comprising
   A. a generally planar surface,
   B. first and second drums having corresponding first and second drum axes about which said drums rotate, said axes being spaced apart from each other and perpendicular to said surface,
   C. a pointer for positioning over the point whose coordinates are to be read,
   D. a first string having one end attached to said pointer and the other end connected directly to, and rotatably wrapped around, said first drum,
   E. a second string having one end attached to said pointer and the other end connected directly to, and rotatably wrapped around, said second drum,
   F. said first and second strings extending parallel to said planar surface when said pointer is positioned over said point, and
   G. angular transducers providing signals indicating the angular positions of said drums about said axes to thereby provide an indication of the coordinates of said point.

2. The position reader defined in claim 1 including biasing means tending to rotate said drums so as to wind said strings onto them, thereby to maintain tension on said strings.

3. The position reader defined in claim 2 in which said biasing means are constant torque devices:
   The reader defined in claim 1
   A. including means for supporting a planar article, such as a drawing containing points whose positions are to be determined, and B. in which said axes are substantially perpendicular to the plane of said article.

4. The reader defined in claim 1 in which the points whose coordinates are to be determined lie on or in close proximity to the circle whose diameter is a line intersecting said axes.

5. The reader defined in claim 1 in which said pointer has inner and outer bearing races to which the respective strings are attached.

* * * * *

UNITED STATES PATENT OFFICE
CERTIFICATE OF CORRECTION

Patent No. 3,665,608        Dated May 30, 1972

Inventor(s) Thomas C. Stockebrand

It is certified that error appears in the above-identified patent and that said Letters Patent are hereby corrected as shown below:

Claim 3, line 2, after "devices" delete the colon (:) and insert a period (.). Delete column 4, line 73 through column 5, line 2.

Signed and sealed this 31st day of October 1972.

(SEAL)
Attest:

EDWARD M. FLETCHER, JR.
Attesting Officer

ROBERT GOTTSCHALK
Commissioner of Patents